United States Patent
Kuehner et al.

(10) Patent No.: US 8,244,782 B2
(45) Date of Patent: Aug. 14, 2012

(54) ROLE-BASED OPERATIONAL COMMUNICATIONS DIRECTORY

(75) Inventors: Nathanael P Kuehner, Palatine, IL (US); Todd A Leigh, East Lansing, MI (US)

(73) Assignee: Motorola Solutions, Inc., Schaumburg, IL (US)

( * ) Notice: Subject to any disclaimer, the term of this patent is extended or adjusted under 35 U.S.C. 154(b) by 842 days.

(21) Appl. No.: 12/115,358

(22) Filed: May 5, 2008

(65) Prior Publication Data

US 2009/0276461 A1 Nov. 5, 2009

(51) Int. Cl.
  *G06F 17/30* (2006.01)
  *G06F 12/00* (2006.01)
  *H04B 7/00* (2006.01)
(52) U.S. Cl. .................... 707/828; 455/519
(58) Field of Classification Search ............ 707/828, 707/999.102; 455/519, 521
  See application file for complete search history.

(56) References Cited

U.S. PATENT DOCUMENTS

| | | | | |
|---|---|---|---|---|
| 6,816,589 B2* | 11/2004 | Pinard | | 379/265.01 |
| 7,016,907 B2* | 3/2006 | Boreham et al. | | 1/1 |
| 7,403,948 B2* | 7/2008 | Ghoneimy et al. | | 707/792 |
| 7,720,881 B2* | 5/2010 | Rowley | | 707/803 |
| 7,769,764 B2* | 8/2010 | Ramer et al. | | 707/751 |
| 7,797,010 B1* | 9/2010 | Manroa et al. | | 455/519 |
| 7,835,736 B2* | 11/2010 | Larocca | | 455/432.3 |
| 2001/0043696 A1* | 11/2001 | Pinard | | 379/265.01 |
| 2003/0065788 A1 | 4/2003 | Salomaki | | |
| 2004/0248597 A1* | 12/2004 | Mathis | | 455/466 |
| 2006/0212932 A1* | 9/2006 | Patrick et al. | | 726/11 |
| 2007/0033196 A1* | 2/2007 | Moore | | 707/10 |
| 2009/0094317 A1* | 4/2009 | Venkitaraman | | 709/203 |

FOREIGN PATENT DOCUMENTS

EP 1850279 A1 10/2007

OTHER PUBLICATIONS

PCT/US2009/039069—International Search Report with Written Opinion—Mailing Date Jan. 20, 2010—12 pages.

* cited by examiner

*Primary Examiner* — Kimberly Wilson
(74) *Attorney, Agent, or Firm* — Hisashi D. Watanabe; Barbara R. Doutre

(57) ABSTRACT

A role-based operational directory facilitates identification of and communication with key contact personnel during an operation. Role-specific directory instances are created in the directory. The role-specific instances are created by a system operator and list the roles involved in an operation and the associations between the roles. The role-specific directory instance is advertised to a selected user, and the selected user associates with the role-specific directory instance. If the user is a key contact for the operation or is otherwise required or allowed to be associated with a role in the operation, the user also associates with a role from the list of roles in the role-specific directory instance. The directory instance is dynamically updated, modified, and tailored as necessary, and transmitted to the communication devices of the selected users of the role-specific directory instance.

32 Claims, 2 Drawing Sheets

ROLE-BASED OPERATIONAL COMMUNICATIONS DIRECTORY

TECHNICAL FIELD OF THE DISCLOSURE

This invention relates generally to communication systems, and more particularly, the present invention pertains to a dynamic role-based directory service and a method for implementing same.

BACKGROUND OF THE DISCLOSURE

As public safety and organizational missions become increasingly larger, joint operations between agencies is becoming more common. Existing barriers to interoperable communications are quickly being removed and cooperation between agencies during operations is increasing. Therefore, the need to be able to identify and communicate with key contact personnel during an operation, especially during interagency operations, is becoming increasingly important.

In many situations, individuals or groups may not have prior knowledge of the identity or contact information of a specific agency, task group, or individual with whom they need to communicate. This could be the case, for example, during incident or event scene management, or even during planned operations. This is especially the case when specific key contacts involved in an operation changes over time even though the roles played by the key contacts involved in the operation remain the same.

In situations such as these, individuals and groups need a way, in real-time, to obtain the identity and contact information of other agencies, task groups or individual key contacts involved in the operation, and also to provide their own identity and contact information to others as appropriate. The mechanisms which accomplish this should be as automatic as possible in order to minimize the burden placed on the user.

Although users may not know each other by name, users will generally be familiar with the role of everyone with whom they need to communicate. For example, users may know that a crew commander is the key contact person during a fire, but the particular person who is filling or playing the role of crew commander for that operation may be unknown.

Therefore, a dynamic communications directory which identifies users and groups by their operational role, and which uses the role assignments to provide a role-appropriate communications directory to a user or group's communication device(s) would enable efficient communications between users and groups who may not otherwise have each other's contact information.

BRIEF DESCRIPTION OF THE FIGURES

The benefits and advantages of the present invention will become more readily apparent to those of ordinary skill in the relevant art after reviewing the following detailed description and accompanying drawings, wherein.

Figure 1:
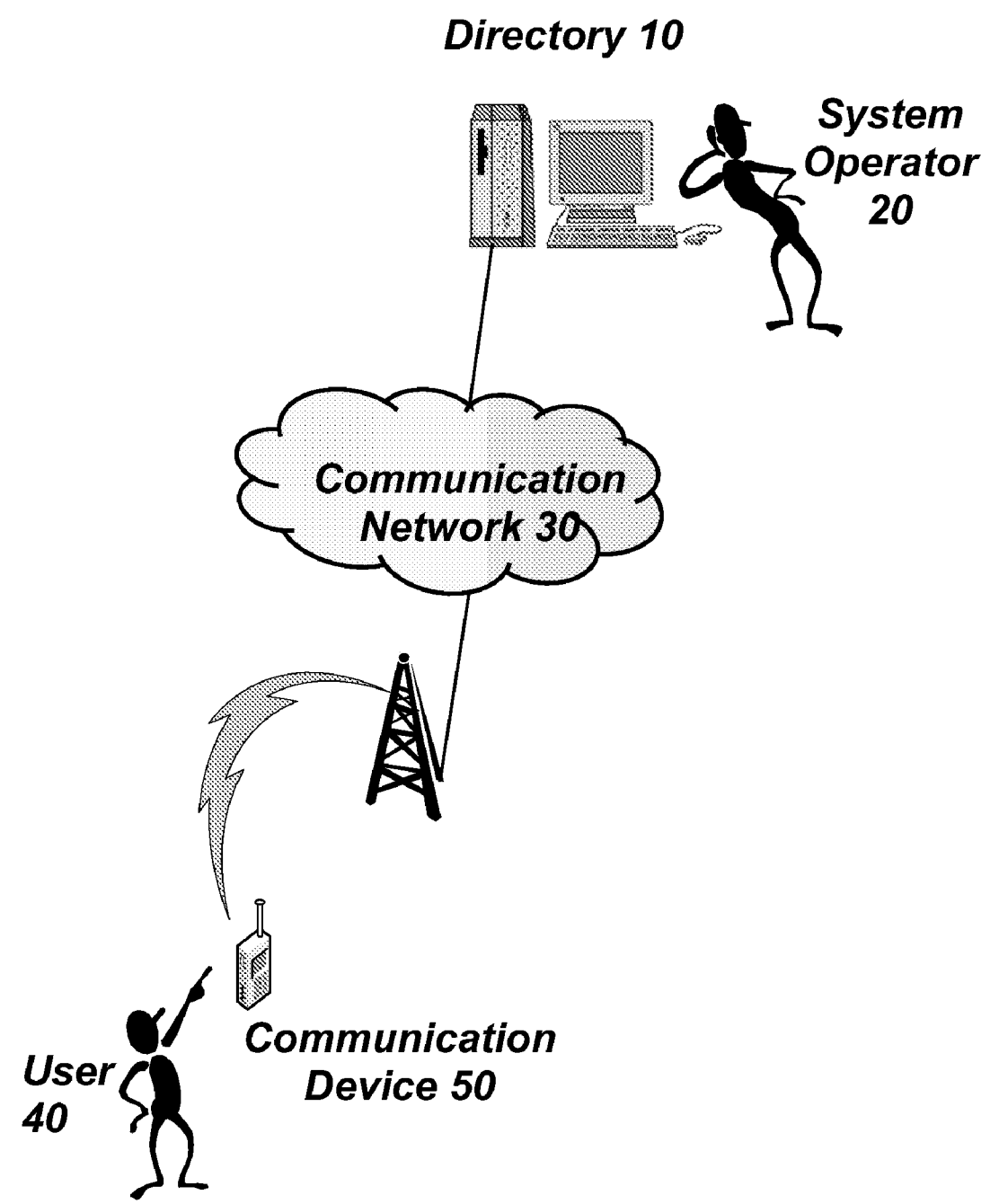
FIG. 1 illustrates an exemplary diagram of a communication system that may be used for implementing the present disclosure.

Skilled artisans will appreciate that elements in the figures are illustrated for simplicity and clarity and have not necessarily been drawn to scale. Also, common, but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions with respect to their corresponding respective areas of inquiry and study except where specific meaning have otherwise been set forth herein.

DETAILED DESCRIPTION OF THE DISCLOSURE

A dynamic role-based directory ("directory") which identifies and lists key contacts and/or key contact groups ("key contact(s)") involved in an incident, pre-planned operation, or event ("operation") and lists the corresponding contact information and the roles or jobs ("roles") the key contact is fulfilling during the operation, in a directory that is easily accessible by and transmitted to communication devices is disclosed herein. The directory of roles, key contacts, and contact information is sent to selected users, who may or may not also serve as key contacts, and/or to selected communication devices, over either broadband or narrowband communication networks.

In general, the roles and the overall structure of communications between roles during an operation may be predefined as part of an organization's or agency's operational plans and procedures. For a specific operation, an authorized system operator, also referred to as a directory manager, dispatcher, or other designated individual or group of individuals, hereafter system operator, creates a role-based directory listing, hereafter "directory instance", in the directory for each particular operation. It is understood that the term "directory" refers to the directory database, directory servers, and all underlying applications, hardware, and software necessary to implement the directory functions of the present disclosure. The directory instance may have a configurable set of individual and group operational role definitions, as well as a configurable set of relationship or associations between the roles to indicate which key contacts fulfilling certain roles need to communicate with each other. The set of operational roles and the relationships between roles for an individual directory instance may be pre-configured, modified, changed, or developed as necessary by the system operator. The directory instance is advertised or sent to selected users or distributed over a selected region. Users are able to receive the advertisement of the directory instance on either narrowband or broadband communication devices and the communication device displays the directory instance to the user on the communication device's graphical user interface. The user may choose to associate with one or more directory instances listed on the communication device's graphical interface. The roles to be filled in an operation are also listed in the directory instance on the communication device's graphical interface. Users who are to serve as key contacts may voluntarily associate, or are associated with, operational roles in the directory instance. The specific users serving as key contacts ("key contact(s)") fulfilling the specific roles during an operation are determined by the key contact, by the particular communication device, by the system operator, or by a combination of any of the three. The directory instance is dynamically updated or modified in the directory with the key contact's contact information and the role with which the key contact has associated. For additional security, the directory or system operator may require authentication and/or authorization before allowing the key contact to associate to some or all roles of the directory instance. When the key contact and the key contact's contact information has been associated with the relevant roles of the operation, the directory instance is continuously updated and distributed to the selected communication devices during the operation. The authorized system operator determines which directory instances are provided to which users, who may or may not be key contacts, and identifies directory instances with which the user may affiliate and/or may monitor. The system operator may dynamically update the instance to accommodate anticipated and unanticipated operational communications needs and may distribute and/or prevent distribution of the directory instance as needed. In addition, the system operator is able to close an instance when the incident or operation is complete and re-open a directory instance as necessary.

Referring now to the figures and in particular FIG. 1, there is illustrated a diagram of a communication system that may be used for implementing the present disclosure. A representation of a directory 10 is illustrated having a system operator 20 managing the directory 10. The directory 10 transmits directory instances over a communications network 30. While a wireless communication network 30 is illustrated as an exemplary embodiment, the directory 10 is able to operate on any communication network infrastructure, provided that the communication network, whether a wired or wireless, trunked or conventional, supports standard packet data services or other type of resource capable of carrying the directory instances. One example of such a system is the APCO Project 25 system. Thus, the directory instances may be sent over a variety of different communication networks 30 that are capable of carrying the directory instances and advertisements.

A user 40 is shown in FIG. 1 equipped with one communication device 50 to receive the directory 10 transmissions. The communication device 50 communicates with the directory 10 through the communication network 30. The communication device 50 is capable of receiving the directory instance and displaying the information to the user. There may be multiple users 40 having multiple communication devices 50, however, for simplicity, only one user 40 and one communication device 50 is illustrated. The user 40 may be operating either or both narrowband and broadband communication devices 50. For example, a communication device 50 may communicate with the directory 10 on the control channel of a narrowband system, or alternatively, on a packet data channel in a broadband system. It is understood that the term "communication device" and "communication devices" are used interchangeably and refer to both wireless and wired devices, narrowband and broadband devices, including, but not limited to, mobile radios, portable radios, cellular radios, cellular phones, personal computers, personal digital assistants, televisions, and the like. Preferably, such communication device 50 has a graphical user interface to display the directory instances to the user 40 in a visual mode, although it is contemplated that the directory instance may also be transmitted to a user's communication device 50 and relayed to the user 40 in an audio mode.

A system operator 20 is present to monitor, dynamically modify, and make available the directory 10 and specific directory instances to users 40 and the users' communication devices 50.

Figure 2:
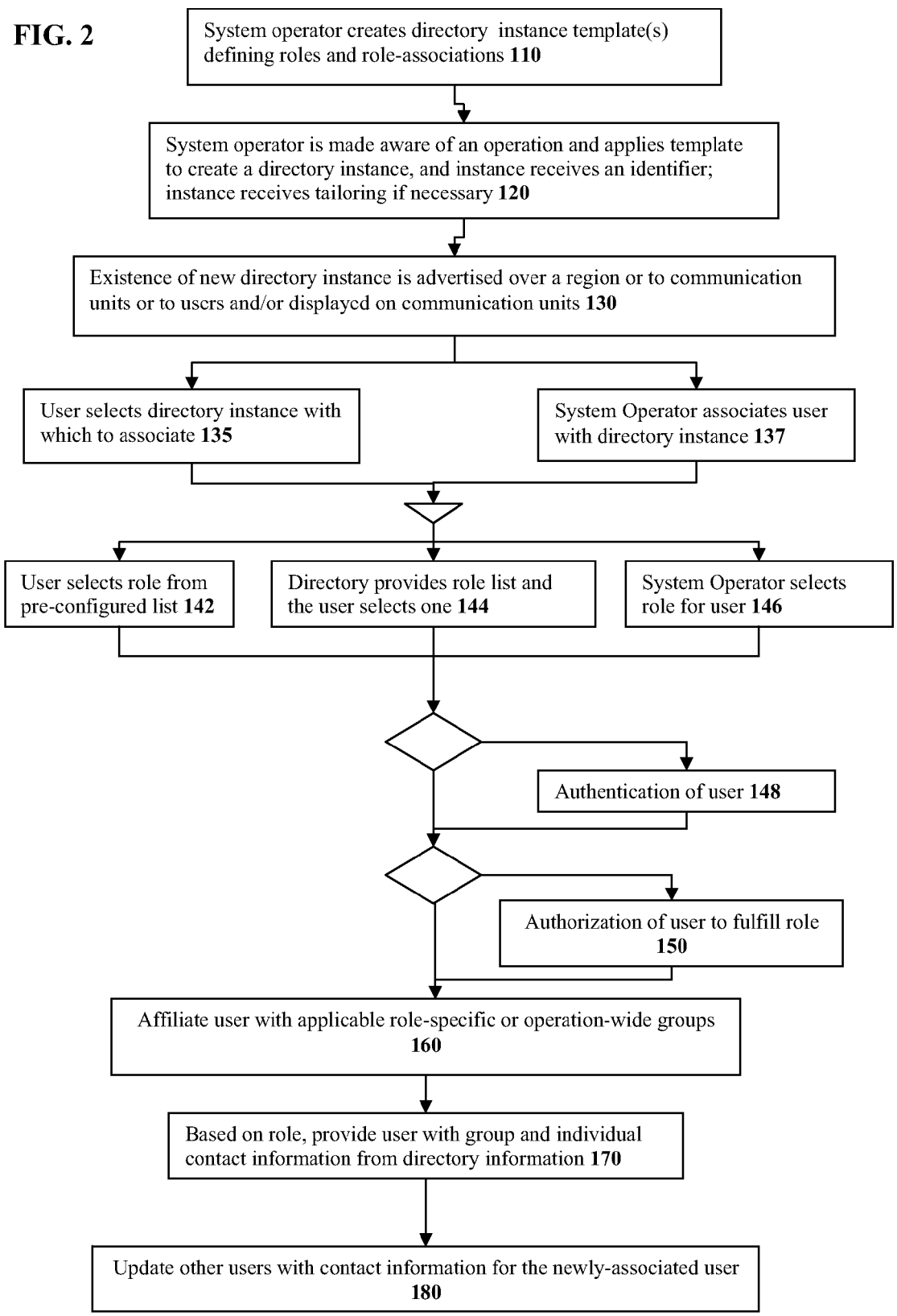
FIG. 2 is a flowchart for a role-based operational directory to identify and associate users with the roles played during an operation and relay the user's contact information to communication devices.

Turning now to FIG. 2, there is shown a flowchart embodying the principles of the present disclosure. Prior to or during an operation, the system operator uses a template defining the roles and role-associations for the operation already programmed into the directory, block 110. The system operator uses the template to create a directory instance of the operation in the directory, block 120. The template is configured with pre-defined roles and role-relationships. The template can be applied to the directory instance and any operation-specific tailoring is added if necessary by the system operator. The directory instance is assigned two aliases or identifications. The system operator assigns the directory instance an alpha or alphanumeric name and the directory automatically assigns the directory instance a unique numeric identifier.

The system operator then advertises the existence of the directory and directory instance, using the directory instance aliases, to communication devices and/or users, block 130. The geographical region over which the directory instance is advertised could be determined in any number of possible ways. Directory advertisement regions could be chosen based on defined radio frequency sites or communication subsystems, such as is defined in the Project 25 communications system, or, could be directly selected by the system operator. Directory advertisement regions also could be determined by the directory based on geographic coordinates provided by the system operator when the directory instance is created. In the latter case, the directory could be configured with information about the geographic coverage areas of, for example, the system's RF sites such that the directory is able to select the RF sites which cover the geographic area indicated by the system operator. Directory advertisement sites also could be determined based on the locations of communication devices whose users could potentially be interested in the directory.

In a narrowband system, distribution of the advertising could be accomplished by periodically transmitting a message on the control channel of the RF site or sites which provide RF coverage of the incident or operation. In another embodiment, the advertising message could be transmitted on a packet data channel which is an RF channel resource assigned to carry user application data, such as the directory instance, and typically provides an internet protocol network connection for a mobile personal computer or other mobile data device, e.g., personal digital assistant. Users interested in the directory instance could be directed to the packet data channel where the information regarding the directory instance is sent. It is understood that the advertising methods disclosed herein are not intended to limit the variety of ways in which the existence of the directory or directory instance is advertised and is only disclosed as an example of the many ways in which the directory instance may be advertised. Any manner of advertising consistent with the spirit of this disclosure is intended to be included.

Once the directory instance is advertised to the communication devices, the user may be associated with the directory instance. A user's communication device records the aliases of the directory instance upon receiving the advertisement of the directory instance. Upon request, the aliases of the directory instances for which the communication device has received advertisements are displayed on the communication device's graphical interface. The order the advertisements are displayed can be individually tailored; however, it is anticipated that the advertisements are displayed in order of the most recently received or in order of importance. In one embodiment, the user selects the directory instance with which to be associated, block 135. The user selects the instance with which the user wishes to associate and the communication device conveys the association request to the directory and/or system operator, block 135. The association request contains the communication device's unit identifier and the directory instance aliases. The request must be conveyed to the directory, which will either process the request automatically or convey the request to the system operator for approval.

In a second embodiment, the system operator associates the user with the directory instance, block 137. This would be appropriate either to accommodate a communication device which is not capable of communicating with the directory, or to unburden the user of the need to associate with the directory instance him or herself. It is understood that neither embodiment is mutually exclusive of the other. During a first operation, the system operator may associate the user with the instance and during a second operation, the user may associate with the directory instance. The system operator dynamically modifies the directory instance based on the specific users associating with the directory instance.

Having associated with the instance, a user who is also a key contact associates with one or more particular roles in the operation. While the directory instance may be provided to multiple users, it is understood that not all users are required to, nor in fact may be allowed, to associate with a role in the operation. Thus, the transmissions of the directory instance may be tailored to simply provide information to some users while encouraging the key contacts to associate with a role in the operation.

A key contact may associate with a role by several methods. In one embodiment, the communication device is preconfigured with a limited list of roles with which the key contact of the communication device may fulfill. In other words, the role list is configured based on the attributes or configuration of the communication device and not the key contact's identity. The communication device then queries the key contact to select the appropriate role in a directory instance of an operation, and then conveys the key contact's selection to the directory, block 142. In another embodiment, the directory provides the communication device with the list of all roles available in the directory instance and queries the user to select the appropriate role in an instance of an operation. The communication device replies to the directory with its key contact's role selection, block 144. In yet another embodiment, the directory notifies the system operator that the communication device has associated with the directory instance, and the system operator selects the role with which the user is associated, block 146.

The directory or system operator may optionally require authentication, block 148 and/or authorization, block 150 prior to associating the key contact with his or her selected role. Alternatively, the directory may be preconfigured with authorized roles for each communication device or key contact, or the system operator may manually approve the key contact's association with his or her role.

Depending on the type of role in question, the directory or system operator may also need to verify that no other key contact already occupies the key contact's selected role. The number of key contacts who may simultaneously be associated with each role is configured as an attribute of each role. Various roles may be individual roles and while others may require or allow multiple key contacts to associate with the role.

As key contacts and/or communication devices are associated with roles, or as the users are changed, the directory instance is dynamically updated. The directory instance may be continuously updated, modified, and relayed to the selected region or devices as key contacts are changed, added, or associated with the directory instance or roles. The directory instance includes such information as the communication device identifiers, and communication device group identifiers, for all roles which are identified in the directory instance and associated with individual key contacts or key contact groups. In addition, the directory provides the associated key contacts with information that the key contact may need in order to fulfill his or her role, block 160. The directory also provides the associated key contact's communication device identity and contact information to other users and other key contacts who occupy roles identified in the directory as needing to communicate with the newly-associated key contact's role in the operation, blocks 170, 180. The directory identifies these key contact individuals and key contact group based on the roles they play and the associations between the roles that are pre-configured in the directory as part of the definition of the overall structure of communications for the operation. The information could be presented to the communication device as a list of user groups or list of users from which the communication device user could select in order to communicate.

The directory could also be used to automatically control the groups with which a user or key contact is affiliated and may be based on the role with which the key contact is associated. Each communication device is regrouped based on the role being played by its key contact rather than based on the communication device's identity. The communication device may also be provided with a set of key contact groups or key contacts to monitor based on the key contact's role.

Using dynamic role associations in operations to provide a directory of key contacts at the operation and controlling their group affiliations is beneficial for several reasons. Not only are the users who serve as key contacts in an operation readily and efficiently identified, this information is conveniently relayed to other users and groups of users quickly. In addition, the association of users to a directory instance also enables the creation of an operation-wide talk groups which allows for addressing all users associated with the directory instance of the operation.

While the present invention is susceptible of embodiment in various forms, there is shown in the drawings and is described a presently preferred embodiment with the understanding that the present disclosure is to be considered an exemplification of the invention and is not intended to limit the invention to the specific embodiment illustrated.

It should be further understood that the title of this section of this specification, namely, "Detailed Description of the Invention", relates to a requirement of the United States Patent Office, and does not imply, nor should be inferred to limit the subject matter disclosed herein.

All patents referred to herein, are incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A method for facilitating identification of and communication with key contact personnel during an operation, the method comprising:

providing a directory;

creating a role-specific directory instance in the directory;

configuring the role-specific directory instance with a list of roles and associations between roles from the list of roles, the list of roles being based on roles associated with the key contact personnel;

advertising the role-specific directory instance to selected communication devices;

associating the selected communication devices with the role-specific directory instance;

dynamically updating and distributing the role-specific directory instance to the selected communication devices as associations are formed;

grouping and regrouping the selected communication devices in response to the updated and distributed role-specific directory instance; and communicating amongst the communications devices of the groupings and using the updated associated role-specific directory instance to determine which communication device or group of devices with which to communicate.

2. The method of claim 1, wherein the directory is managed by a system operator who configures roles and relationships between roles, and wherein the directory provides role-specific contact information to communication devices based on each communication device's role and relationships between roles.

3. The method of claim 1, wherein the role-specific directory instance is advertised over a selected geographical region.

4. The method of claim 1, wherein the role-specific directory instance is advertised to selected communication devices.

5. The method of claim 1, wherein information regarding the role-specific directory instance is transmitted over a narrowband communications network.

6. The method of claim 1, wherein information regarding the role-specific directory instance is transmitted over a broadband communications network.

7. The method of claim 1, wherein the role-specific directory instance is assigned with an identifier.

8. The method of claim 7, wherein a communication device records the role-specific directory instance identifier upon receiving the role-specific directory instance advertisement.

9. The method of claim 8, wherein the communication device displays the role-specific directory instance identifier on the communication device's graphical user interface.

10. The method of claim 8, wherein the directory provides the communication device with the list of possible roles in the role-specific directory instance and the communication device enables association with a role from the list of roles.

11. The method of claim 1, further comprising the step of associating with a role from the list of roles in the role-specific directory instance, thereby providing the communication device's contact information for that role to the directory.

12. The method of claim 11, wherein the directory requires authentication or authorization prior to associating with the role from the list of roles.

13. The method of claim 1, wherein association with the directory instance further enables the creation of operation-wide talkgroups which address all communication devices associated with the role-specific directory instance.

14. The method of claim 1, wherein the list of roles is configured based on attributes or configuration of the communication device and not key contact personnel identity.

15. The method of claim 14, wherein the communication device further queries the key contact personnel to select an appropriate role in the directory instance of an operation, and then conveys the key contact personnel's selection to the directory.

16. The method of claim 1, wherein the directory provides the communication device with the list of all roles available in the directory instance and queries the key contact personnel to select the appropriate role in an instance of an operation, and the communication device replies to the directory with its key contact's role selection.

17. The method of claim 1, wherein the directory notifies a system operator that the communication device has associated with the directory instance, and the system operator selects the role with which the key contact personnel is associated.

18. The method of claim 1, wherein the directory and role-specific directory instances are based on the type of operation.

19. A communication system configured for identification of and communication with key contact personnel during an operation, the communication system comprising:

a plurality of communication devices;

a directory for communicating with the plurality of communication devices; and a role-specific directory instance created in the directory, the role-specific directory instance configured with a list of roles in the operation and associations between roles, the list of roles being based on roles associated with the key contact personnel, and wherein the role-specific directory instance is advertised to selected communication devices amongst the plurality of communication devices, and communications devices form associations with the role-specific directory instance, the directory identifying communication devices based on the association and automatically grouping and regrouping the selected communication devices for communication based on changing roles played by the key contact personnel using the communication devices.

20. The communication system of claim 19, wherein an association is formed with a role from the list of roles in the role-specific directory instance.

21. The communication system of claim 19, wherein the directory is managed by a system operator who configures roles and relationships between roles, and wherein the directory provides role-specific contact information to communication devices based on each communication device's role and relationships between roles.

22. The communication system of claim 19, wherein the role-specific directory instance is advertised over a selected geographical region.

23. The communication system of claim 19, wherein a user associates with the role-specific directory instance and the user associates with a role from the list of roles.

24. The communication system of claim 19, wherein the role-specific directory instance has identifier assigned thereto.

25. The communication system of claim 24, wherein the role-specific directory instance is advertised to selected communication devices and wherein the role-specific directory instance identifier is displayed on the communication devices.

26. The communication system of claim 25, wherein the directory provides the communication device with the list of possible roles in the role-specific directory instance and the communication device enables a user to associate with a user role thereby providing the communication device's contact information for that role to the directory.

27. The communication system of claim 19, wherein association with the directory instance further enables the creation of operation-wide talkgroups which address all communication devices associated with the role-specific directory instance.

28. The communication system claim 19, wherein the list of roles is configured based on attributes or configuration of the communication device and not key contact personnel identity.

29. The communication system of claim 28, wherein the list of roles is configured based on attributes or configuration of the communication device and not key contact personnel identity.

30. The communication system of claim 19, wherein the directory provides the communication device with the list of all roles available in the directory instance and queries the key contact personnel to select the appropriate role in an instance of an operation, and the communication device replies to the directory with its key contact's role selection.

31. The communication system of claim 19, wherein the directory notifies a system operator that the communication device has associated with the directory instance, and the system operator selects the role with which the key contact personnel is associated.

32. The communication system of claim 19, wherein the directory role-specific directory instances are based on the type of operation.

* * * * *

UNITED STATES PATENT AND TRADEMARK OFFICE
CERTIFICATE OF CORRECTION

| | | |
|---|---|---|
| PATENT NO. | : 8,244,782 B2 | Page 1 of 1 |
| APPLICATION NO. | : 12/115358 | |
| DATED | : August 14, 2012 | |
| INVENTOR(S) | : Kuehner et al. | |

It is certified that error appears in the above-identified patent and that said Letters Patent is hereby corrected as shown below:

In Column 9, Line 6, in Claim 28, delete "system claim" and insert -- system of claim --, therefor.

Signed and Sealed this
Twenty-second Day of January, 2013

David J. Kappos
*Director of the United States Patent and Trademark Office*